(12) United States Patent
Sheldon et al.

(10) Patent No.: US 10,330,949 B2
(45) Date of Patent: Jun. 25, 2019

(54) FRAME SUPPORT MEMBER AND FRAME SUPPORT ASSEMBLY FOR OVER-THE-GLASSES (OTG) EYEWEAR

(71) Applicant: Brent Sheldon, Miami Beach, FL (US)

(72) Inventors: Brent Sheldon, Miami Beach, FL (US); Guy Brousseau, Jr., Marieville (CA); Amélie Brisson Laperle, Saint-Basile-le-Grand (CA); Benoit Orban, Saint-Lambert (CA); Manuel Léveillé, Montréal (CA)

(73) Assignee: Brent Sheldon, Miami Beach, FL (US)

( * ) Notice: Subject to any disclaimer, the term of this patent is extended or adjusted under 35 U.S.C. 154(b) by 17 days.

(21) Appl. No.: 15/869,426

(22) Filed: Jan. 12, 2018

(65) Prior Publication Data

US 2018/0196280 A1    Jul. 12, 2018

Related U.S. Application Data

(63) Continuation-in-part of application No. 15/404,943, filed on Jan. 12, 2017, now Pat. No. 10,073,284.

(51) Int. Cl.
*G02C 5/12* (2006.01)
*G02C 9/04* (2006.01)

(52) U.S. Cl.
CPC .............. *G02C 5/126* (2013.01); *G02C 5/122* (2013.01); *G02C 9/04* (2013.01)

(58) Field of Classification Search
CPC .......... G02C 3/003; G02C 5/122; G02C 9/04; A61F 9/026
USPC ......................................................... 351/57
See application file for complete search history.

(56) References Cited

U.S. PATENT DOCUMENTS

| | | |
|---|---|---|
| 2,607,919 A | 8/1952 | Stegeman |
| 4,280,758 A | 7/1981 | Flader et al. |
| 7,204,589 B2 | 4/2007 | Pieterman |
| 7,497,570 B2 | 3/2009 | Cohen et al. |
| 7,591,555 B1 | 9/2009 | Chen |
| 8,087,776 B2 | 1/2012 | Pulito |
| 8,142,014 B2 | 3/2012 | Hones |
| 8,931,894 B1 | 1/2015 | Chen |
| 2006/0098159 A1 | 5/2006 | Canavan et al. |

(Continued)

FOREIGN PATENT DOCUMENTS

| | | |
|---|---|---|
| FR | 2 818 394 A1 | 6/2002 |
| TW | M438639 | 10/2012 |
| WO | 2012/005509 A2 | 1/2012 |

OTHER PUBLICATIONS

Stewart, W.; International Search Report from corresponding PCT Application No. PCT/CA2018/050029; search completed Apr. 13, 2018.

*Primary Examiner* — Collin X Beatty
*Assistant Examiner* — Grant A Gagnon

(57) ABSTRACT

There is provided a frame support member for eyewear having a frame, with the frame including a nose bridge. The frame support member includes an attachment portion at a first end thereof for coupling the frame support member to the nose bridge of the eyewear, and a nose engaging portion at a second end thereof. The frame support member is configured to position the nose engaging portion below and behind the nose bridge for supporting the eyewear on a user. There is also provided eyewear that includes a frame for supporting at least one lens, a nose bridge for supporting the frame on a user, and the frame support member as herein described.

29 Claims, 20 Drawing Sheets

(56) References Cited

U.S. PATENT DOCUMENTS

2014/0375948 A1 12/2014 Chen
2016/0193070 A1 7/2016 Castillo

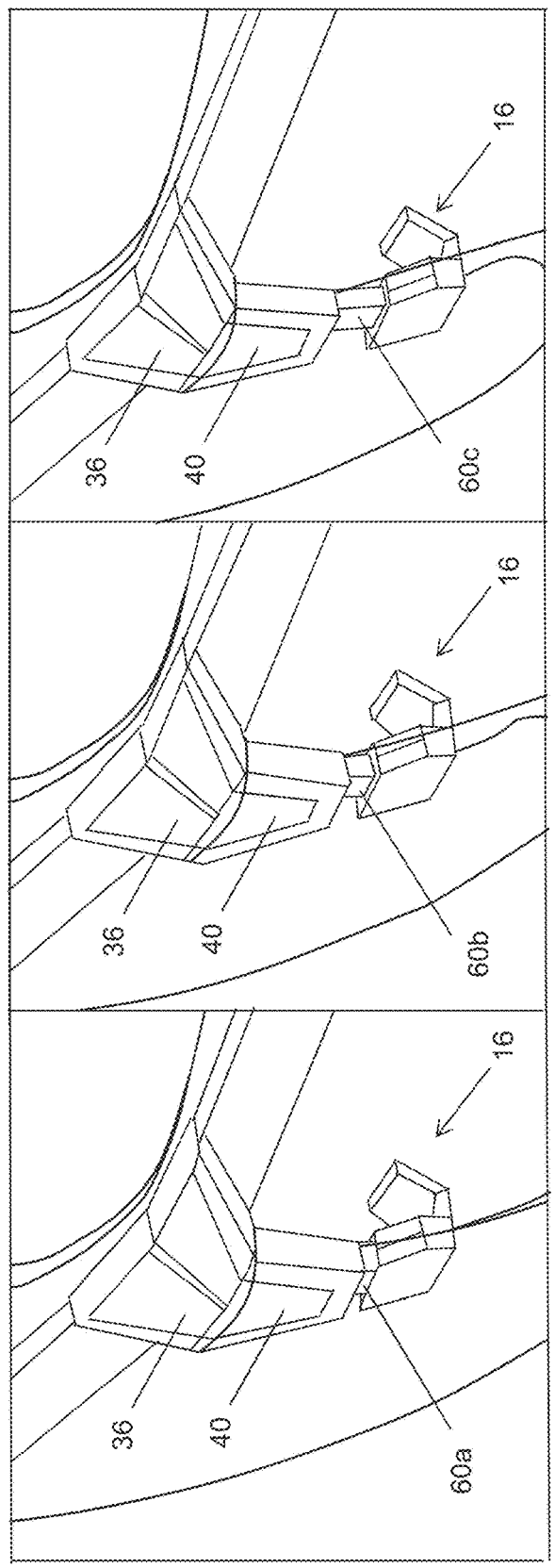

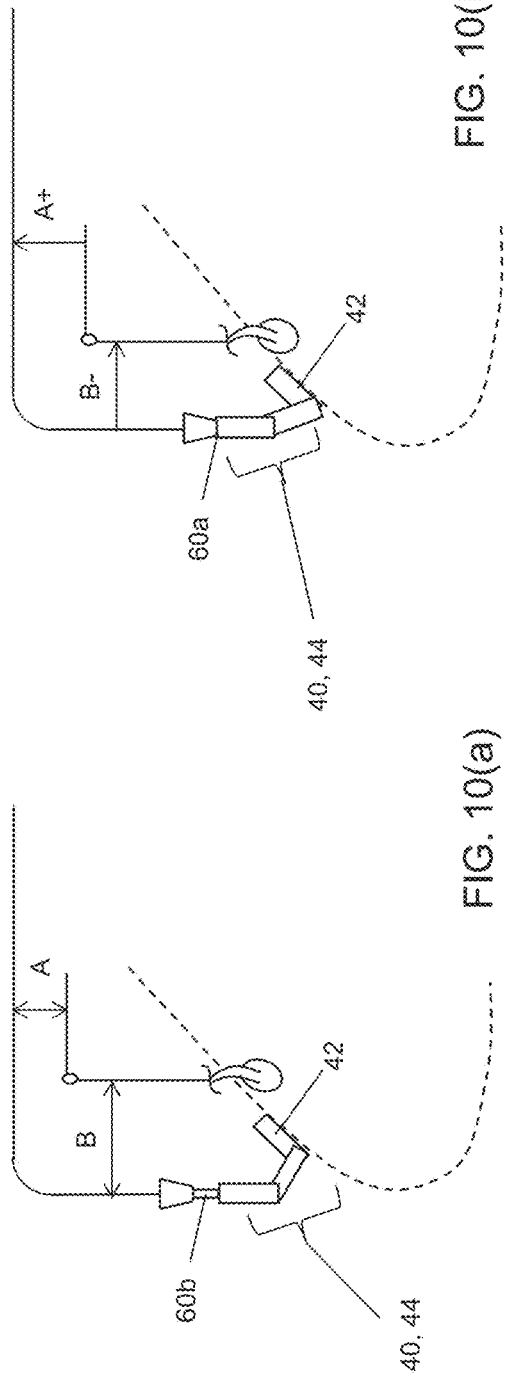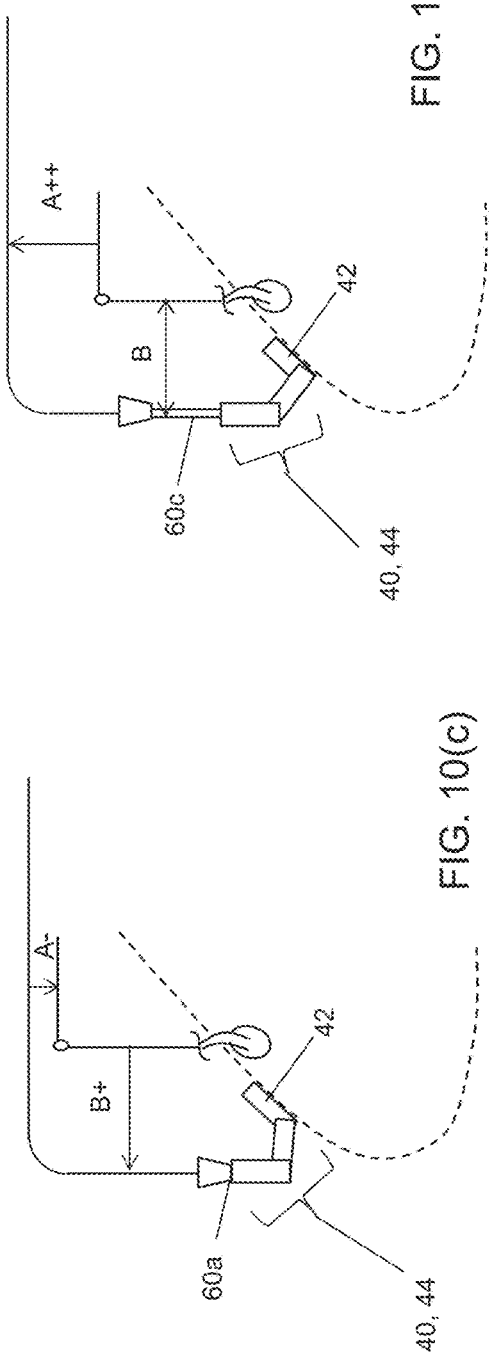

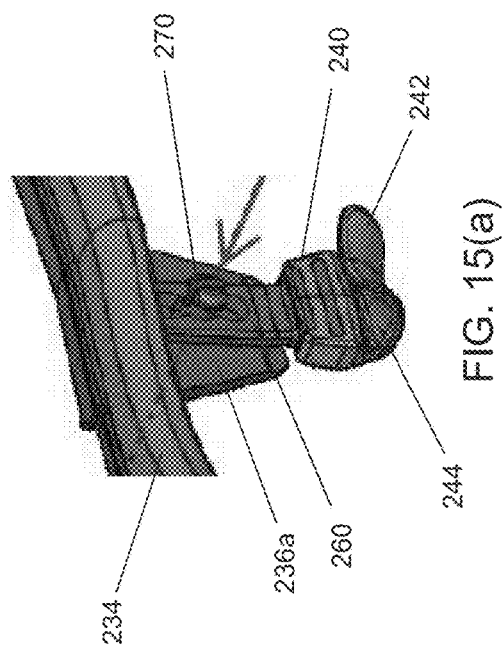
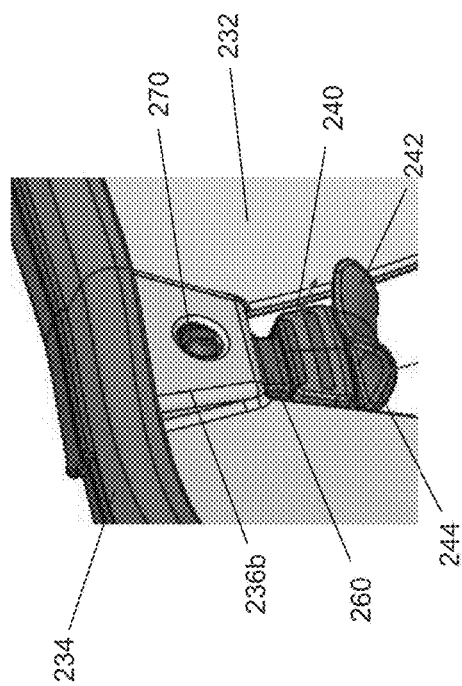
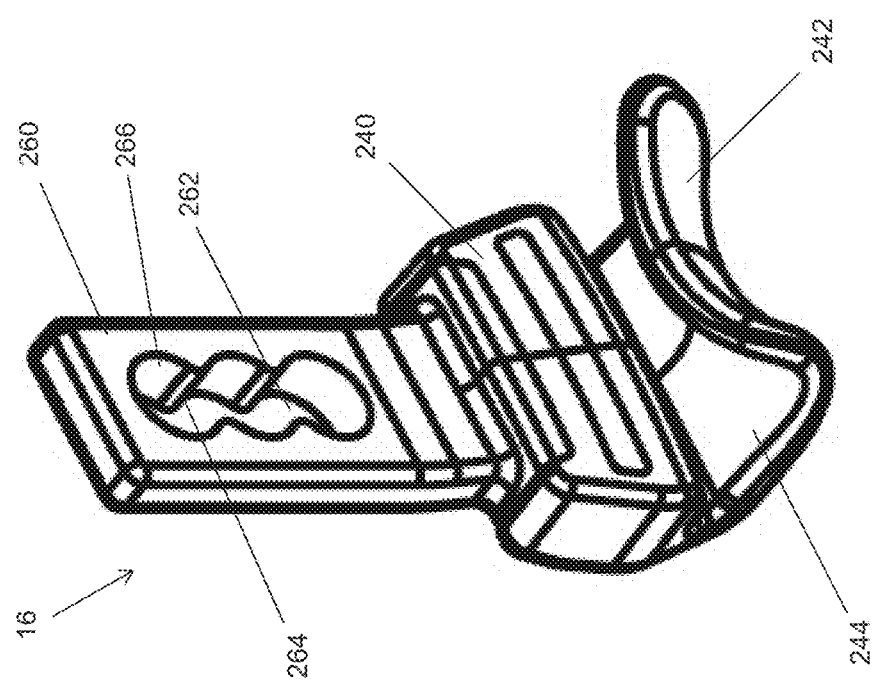
FIG. 15(a)
FIG. 15(b)
FIG. 14

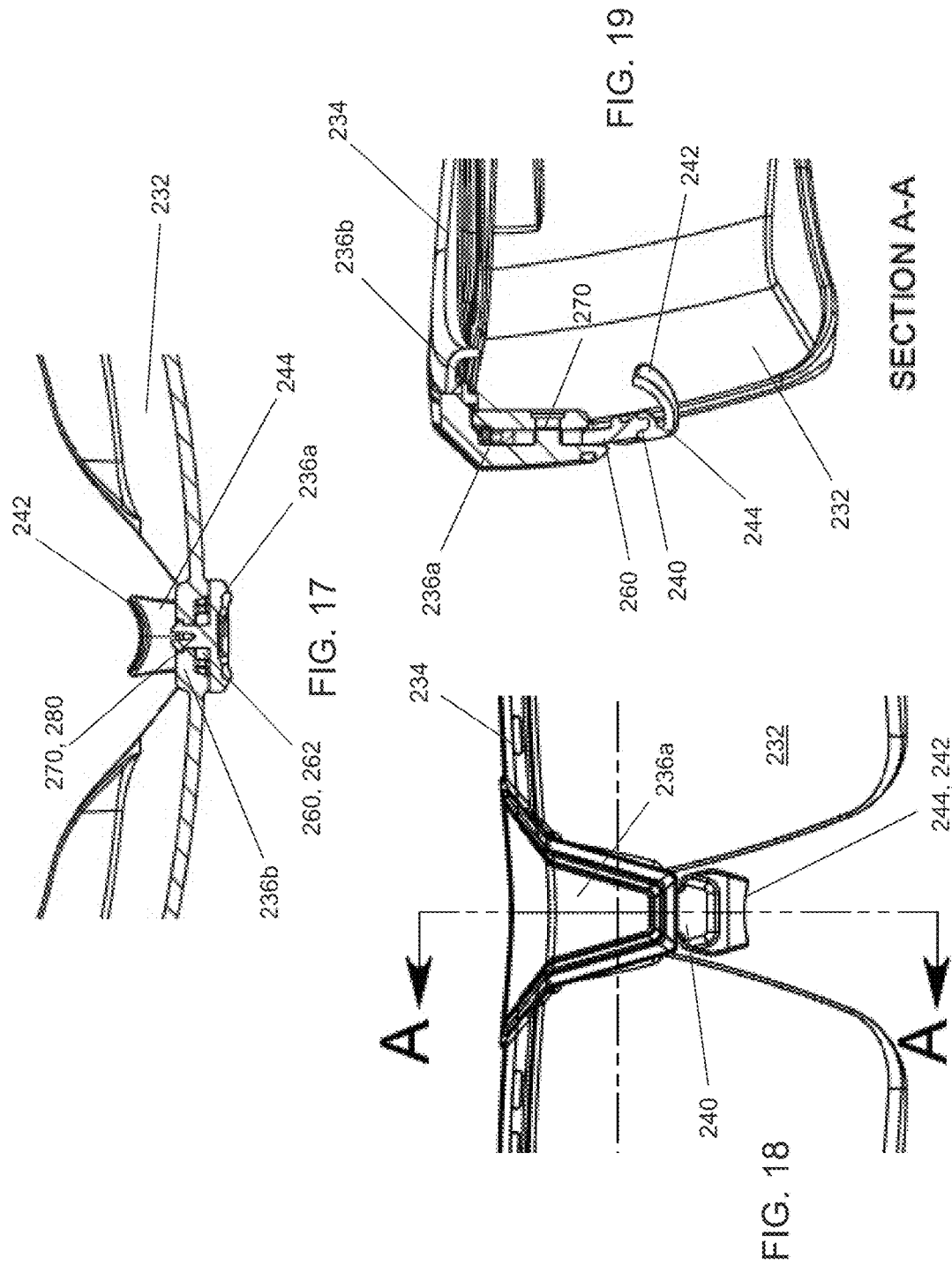

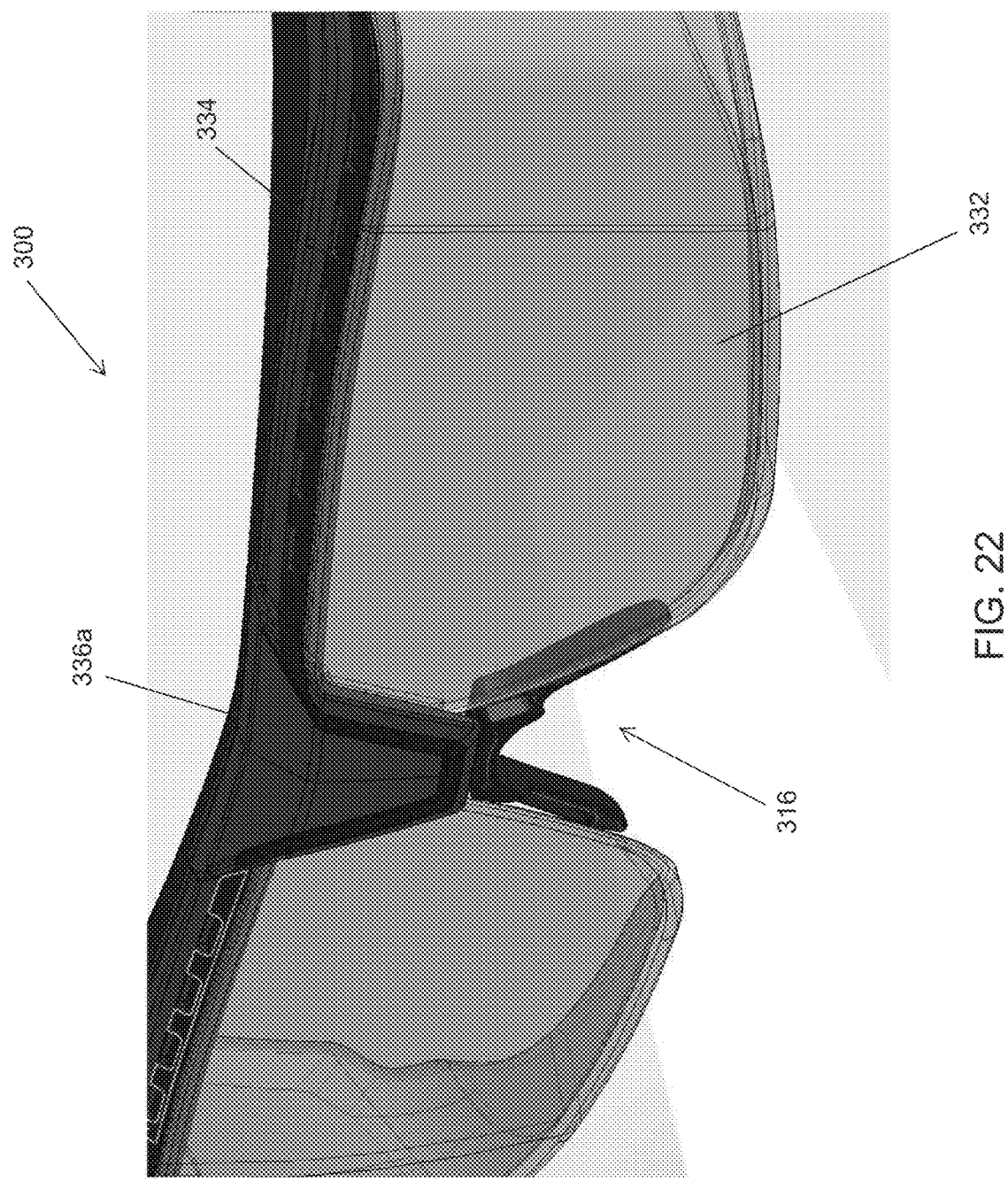

FRAME SUPPORT MEMBER AND FRAME SUPPORT ASSEMBLY FOR OVER-THE-GLASSES (OTG) EYEWEAR

CROSS-REFERENCE TO RELATED APPLICATION(S)

This application is a continuation-in-part of U.S. application Ser. No. 15/404,943 filed on Jan. 12, 2017, the contents of which are incorporated herein by reference.

TECHNICAL FIELD

The following relates to support assemblies for eyewear, in particular to position secondary eyewear such as over-the-glasses (OTG) eyewear, relative to primary eyewear, such as prescription eyewear.

DESCRIPTION OF THE RELATED ART

Conventional eyewear, particularly prescription eyeglasses, may be required by a user at all or most times to improve their vision. Eyeglasses generally include a frame that supports one or more lenses. The frame typically includes a nose bridge or nose pieces that engage the user's nose to support the eyeglasses on the user's head. Eyeglasses also typically include a pair of arms attached to (or integral with) the frame, to further support the eyeglasses, e.g. by resting the arms on the user's ears or engaging their head in the temple region.

Safety eyewear is required in various scenarios, such as on a job or construction site, shop or factory floor, etc. While prescription safety eyewear exists, the costs associated with having prescription lenses for safety eyewear can be prohibitive. Moreover, having prescription lenses for safety eyewear may not be feasible, particularly when the safety eyewear is meant to be shared and reused, e.g., by visitors to a jobsite. For these reasons, safety eyewear has been known to be constructed to fit over a conventional pair of eyeglasses in order to eliminate the need for the user to remove their prescription eyewear or to possess prescription safety eyewear. Such solutions are commonly referred to as "over the glasses" or "OTG" type eyewear.

One problem with OTG type eyewear is that the OTG frames often rest on the prescription frames, which can cause the prescription frames to be pulled downwardly on the user's nose, causing misalignment of the lenses and/or causing general discomfort.

Moreover, typical OTG frames may rest or be pushed against the front of the prescription lenses, which can cause damage to the more valuable eyewear, or cause the prescription lenses to impinge the user's face This may occur when the OTG frames act as they are intended to, namely to deflect debris and other objects from the user's face.

It is an object of the following to address at least one of the above-noted disadvantages.

SUMMARY

In order to support secondary eyewear (e.g., safety eyewear) that is worn over primary eyewear (e.g., prescription eyewear), a frame support member is provided that engages the user's nose to support the secondary eyewear above and away from the primary eyewear frames and thus reduce interference between the primary and secondary eyewear frames. The support member can also reduce or eliminate downward forces imparted by the secondary eyewear on the primary eyewear by having at least a portion of a nose-engaging portion be positioned below and behind the lenses of the secondary eyewear such that the secondary eyewear is physically separated from the underlying primary eyewear. Separation can also be provided between the secondary eyewear and the lenses of the primary eyewear by incorporating the support member. In some implementations, a frame support assembly is provided that includes the support member with adjustability. The assembly or support member can be adjusted through flexure or extendibility to accommodate different users. The assembly or support member, and/or aspects thereof can also be used for primary eyewear that is worn on its own (e.g., safety eyewear worn without underlying prescription eyewear).

In one aspect, there is provided a frame support member for eyewear comprising a frame and a lens, the frame of the eyewear comprising a nose bridge portion, the frame support member comprising: an extendable attachment portion for coupling the frame support member to the nose bridge portion of the eyewear, wherein the attachment portion comprises a contoured aperture for receiving a post extending from the nose bridge portion or the lens of the eyewear, the post engaging the contoured aperture to provide a plurality of vertical positions relative to the frame; and a nose engaging portion extending from the attachment portion for supporting the eyewear on a user.

In another aspect, there is provided eyewear comprising: a frame for supporting at least one lens, the frame comprising nose bridge portion; a frame support member comprising an extendable attachment portion for coupling the frame support member to the nose bridge portion of the eyewear, wherein the attachment portion comprises a contoured aperture for receiving a post extending from the nose bridge portion or the lens of the eyewear, the post engaging the contoured aperture to provide a plurality of vertical positions relative to the frame; and a nose engaging portion extending from the attachment portion for supporting the eyewear on a user; wherein the frame support member is configured to position the nose engaging portion below and behind the nose bridge for supporting the eyewear on a user.

BRIEF DESCRIPTION OF THE DRAWINGS

Embodiments will now be described by way of example only with reference to the appended drawings wherein:

FIGS. 9(a) to 9(c) illustrate perspective views of a frame support assembly with an adjustable frame support member in a series of positions;

FIGS. 10(a) to 10(d) are schematic views illustrating adjustability features for a frame support assembly with adjustable and flexible frame support members;

FIG. 14 is a rear perspective view of the frame support member of FIG. 13.

FIG. 15(a) is a perspective view of the frame support member supported on a post protruding from the frame portion;

FIG. 15(b) is a perspective view of the frame support member assembled with the frame portion and the lens portion;

FIG. 17 is a sectional view of the assembled frame support member;

FIG. 18 is a front view of the assembled frame support member;

FIG. 19 is a sectional side view of the frame support member along section A-A in FIG. 18;

FIG. 22 is a front perspective view of an eyewear frame assembly having yet another alternative frame support member interposed between a frame portion and a lens portion;

DETAILED DESCRIPTION

Figure 1:
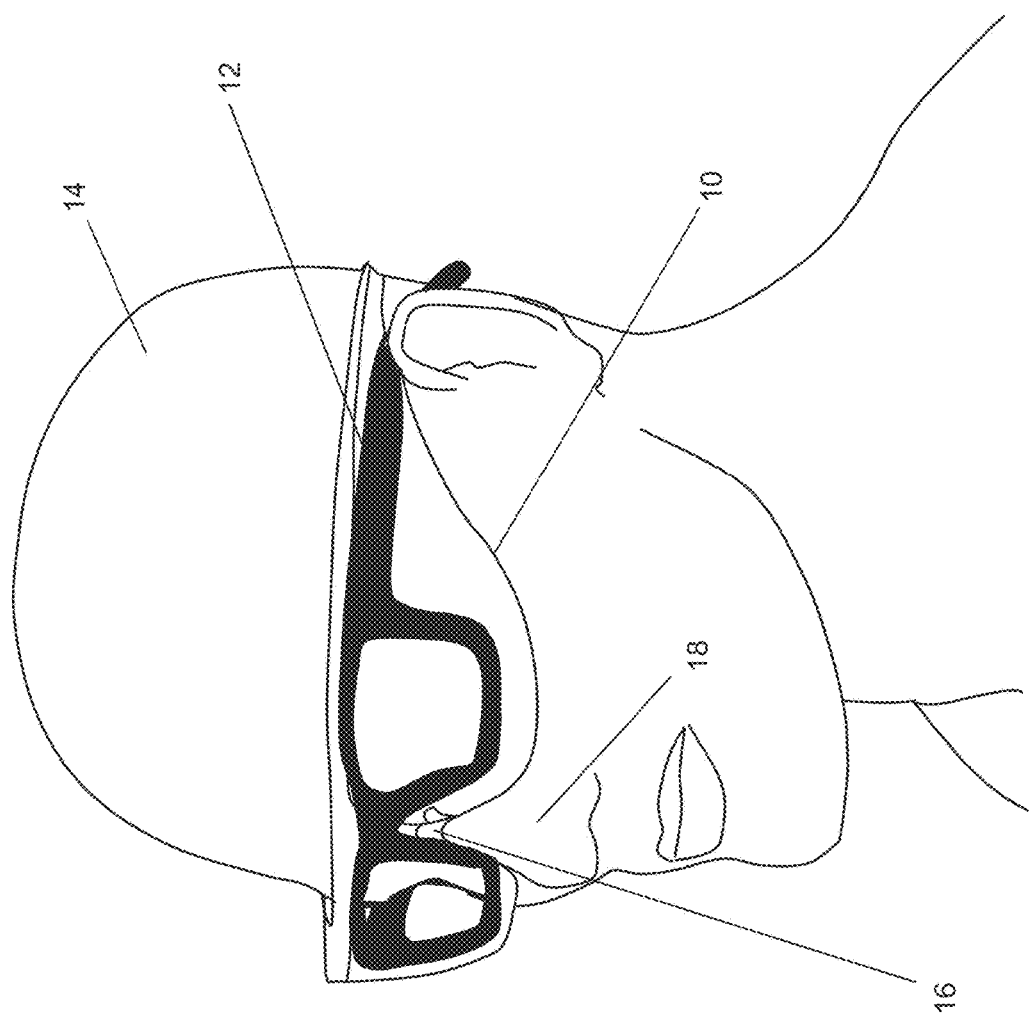
FIG. 1 is a perspective view of a user with over the glasses (OTG) eyewear worn over a prescription eyewear frame.

Turning now to the figures, FIG. 1 illustrates safety eyewear 10 (i.e. "secondary" eyewear) being worn over an underlying eyewear (i.e., "primary" eyewear), in this example a pair of prescription eyeglasses 12. Both the safety eyewear 10 and the underlying prescription eyeglasses 12 are shown as being worn by a user 14 and are supported on the user 14 at least in part by resting on the user's nose 18. The safety eyewear 10 is supported relative to the prescription eyeglasses 12 using a frame support member 16 that engages the user's nose 18 as explained in greater detail below. A frame support assembly that incorporates the frame support member 16 and other features providing adjustability may also be provided, as also explained in greater detail below.

Figure 2:
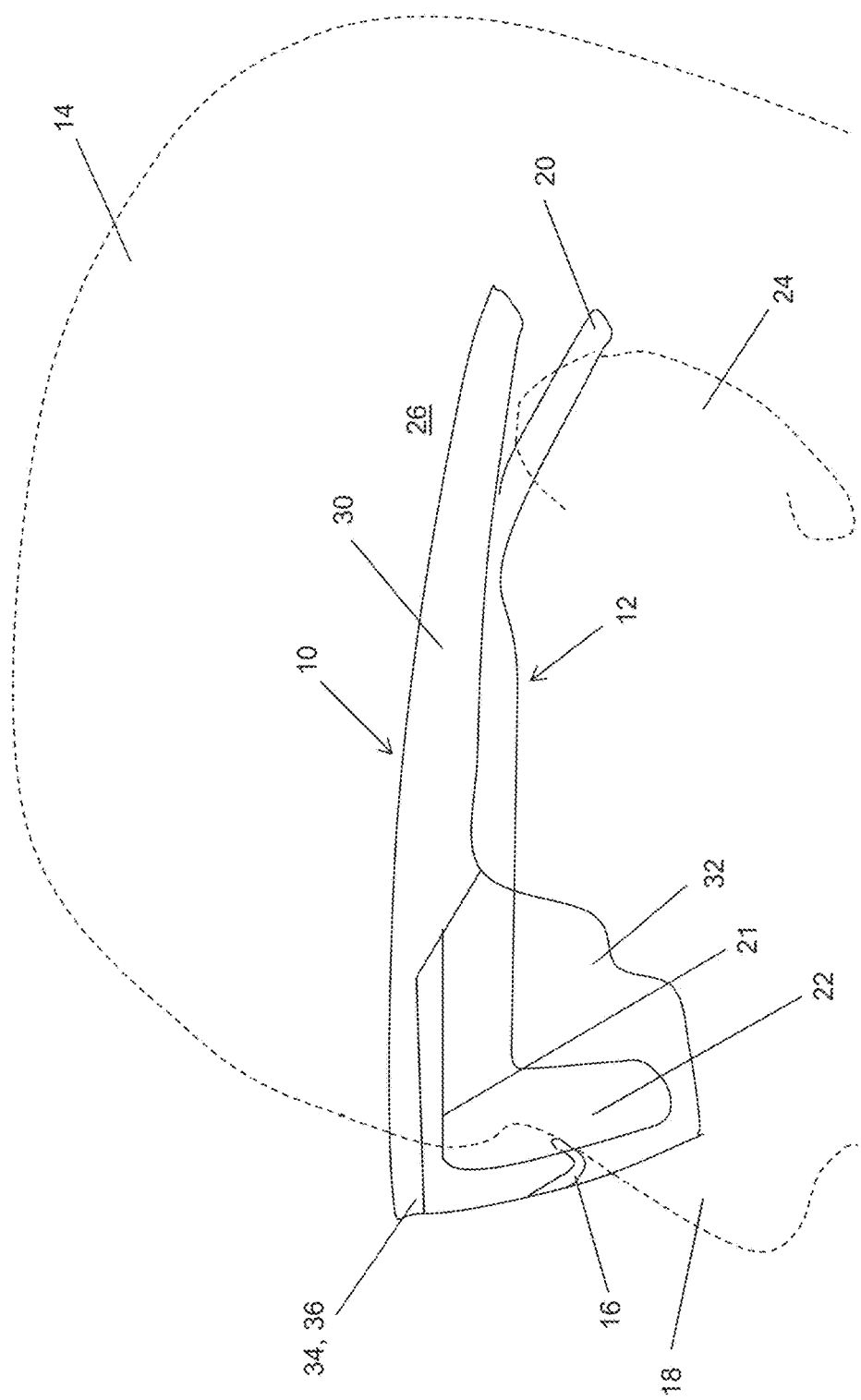
FIG. 2 is a side view of a user with OTG eyewear worn over a prescription eyewear frame.

As illustrated in FIG. 2, the prescription eyeglasses 12 include a pair of arms 20 that are either pivotally attached to, or integral with a frame 21 that holds or otherwise supports a pair of prescription lenses 22 as is known in the art. The prescription eyeglasses 12 can also be further supported on the user 14 by resting the arms 20 on the user's ears 24. The safety eyewear 10 in the example shown in FIG. 2 includes a pair of arms 30 that are either pivotally attached to, or integral with a frame 34 that holds or otherwise supports a pair of safety lenses 32. The safety eyewear 10 in the example shown in FIG. 2 are additionally supported on the user by engaging temple portions 26 of the user's head 14. However, it can be appreciated that the arms 30 of the safety eyewear 10 can instead rest upon the user's ears 24. The safety lenses 32 can be made from any suitable material providing impact and shatter resistance and, as illustrated in FIG. 2, these lenses 32 can partially wrap around the user's head 14 to provide side impact protection.

Figure 3:
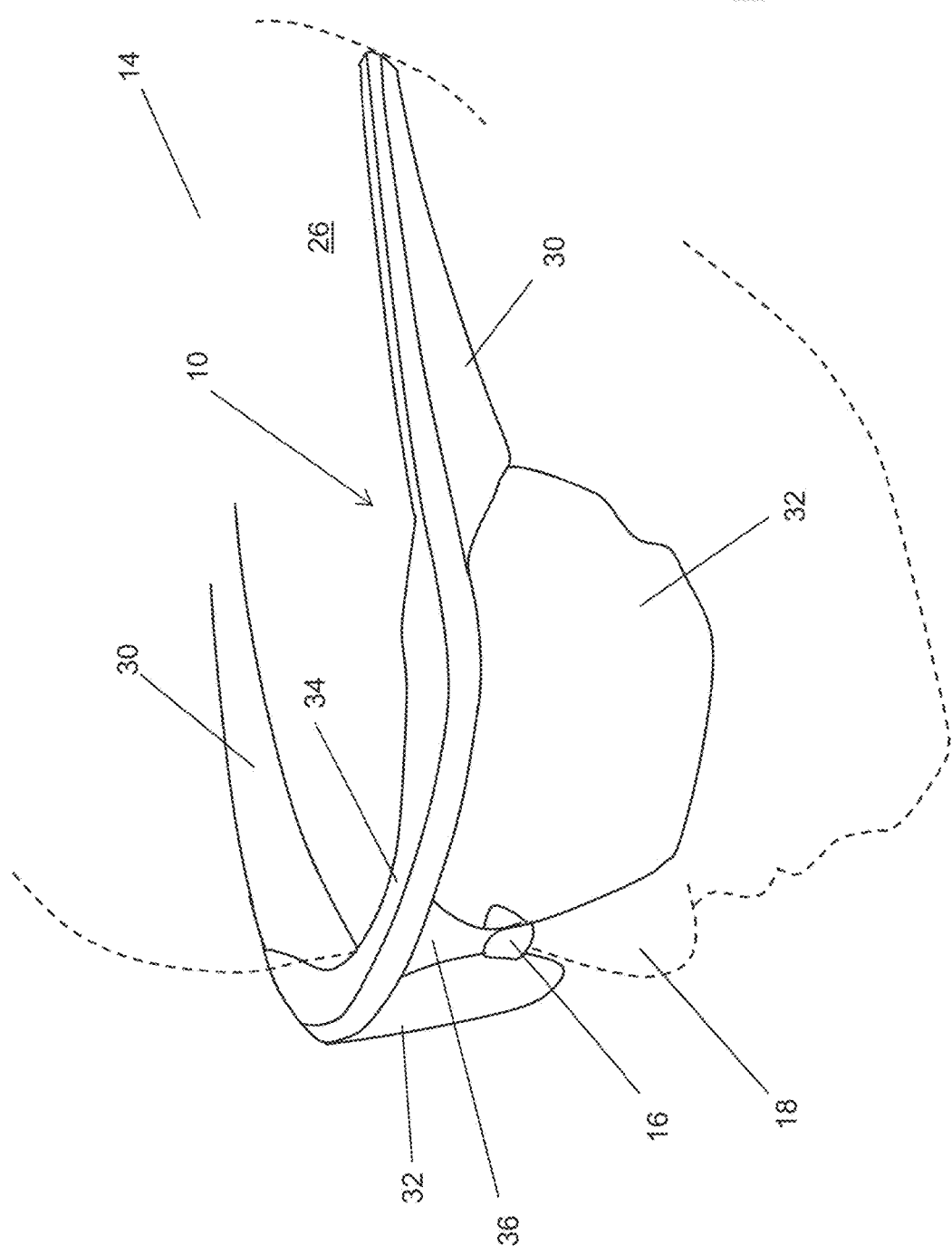
FIG. 3 is a perspective view of only the OTG eyewear worn by the user.

Referring to both FIGS. 2 and 3, the frame 34 can include a nose bridge 36 that is positioned between the pair of lenses 32. It can be appreciated that the nose bridge 36 can also be formed from a central portion of a single lens 32 and need not be a separate element. As can be seen in FIG. 2, the frame support member 16 is shaped such that it extends downwardly and rearwardly (i.e. below and behind the lenses 32) to engage the user's nose 18. In this way, the safety eyewear 10 is separately and independently supported on the user's nose 18 by being positioned above the frame 21 and away from the lenses 22 of the primary eyewear. That is, in this example, the frame support member 16 inhibits the safety eyewear 10 from resting upon the underlying prescription eyeglasses 12 which, as explained above, can cause the safety eyewear 10 to pull or drag the prescription eyeglasses 12 down the user's nose and cause misalignment of the lenses 22 with the user's eyes and/or general discomfort.

By providing inherent adjustability in the frame support member 16 itself, or by providing a frame support assembly that provides adjustability with/for the frame support member 16, the frame support member 16 can enable the same pair of safety eyewear 10 to be adjusted to suit different users with different head sizes, shapes, positioning of facial features, etc.

The view shown in FIG. 3 also illustrates that the frame support member 16 is also suitable for use with any eyewear, including primary eyewear without any secondary eyewear (or vice versa). While FIG. 3 shows the frame support member 16 used with safety eyewear 10, it can be appreciated that the frame support member 16 can also be used with prescription eyeglasses 12 or any other type of eyewear such as sports eyewear or an eyewear accessory (e.g., a magnetic or other type of clip-on sunglasses).

Figure 4:
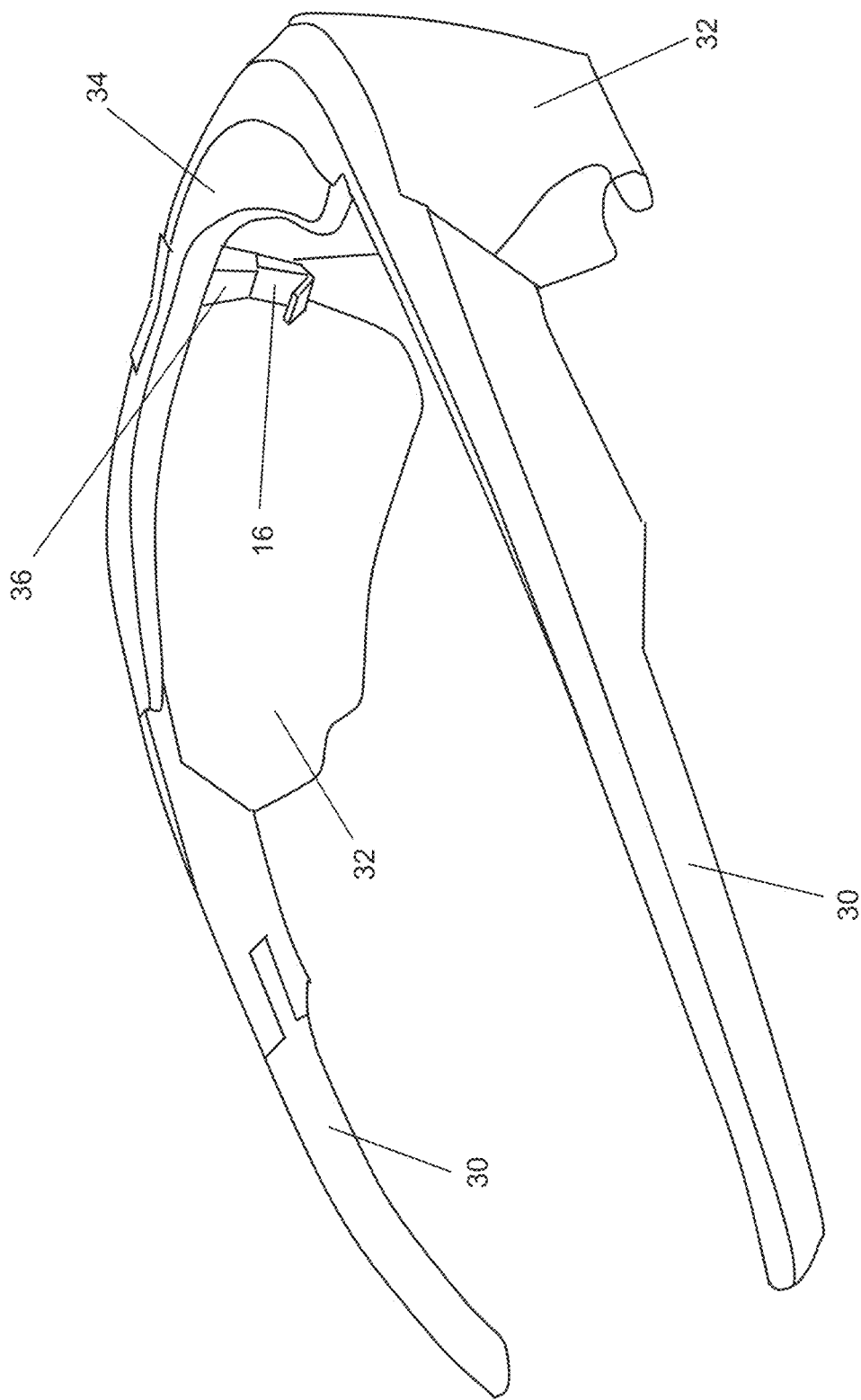
FIG. 4 is a perspective view of OTG eyewear showing a rear view of a frame support member.
Figure 5:
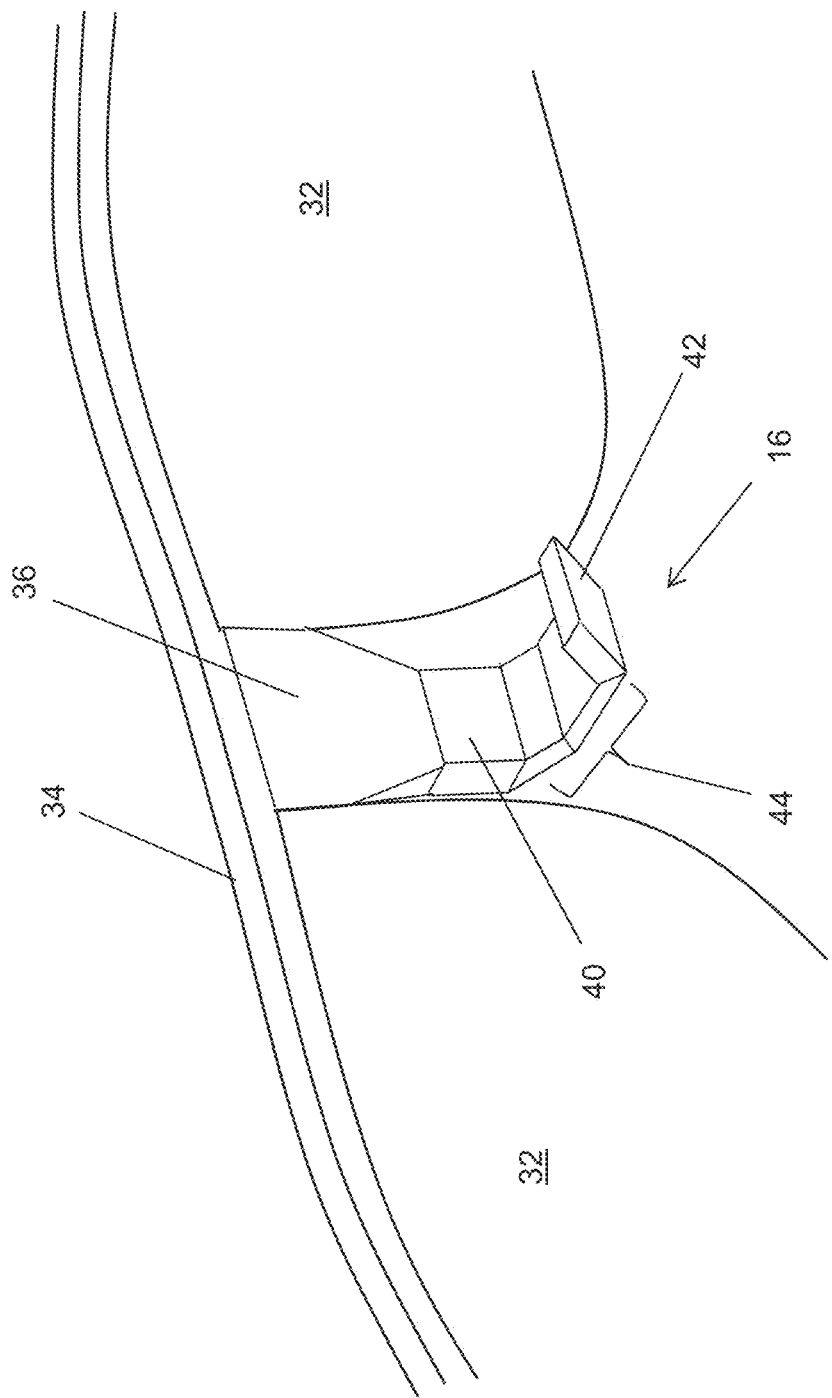
FIG. 5 is a partial enlarged rear perspective view of the frame support member.

A frame support assembly comprising a nose bridge member 36 and the frame support member 16 is shown in FIGS. 4 and 5. The enlarged view in FIG. 5 illustrates one example configuration for the frame support member 16 have a vertically oriented portion 40 connected to an angled nose-engaging portion 42 via a contoured central portion 44. In this example, the central portion 44 includes a pair of segments angled with respect to each other to position the nose-engaging portion 42 behind the nose bridge 36 and vertical portion 40 as best seen in FIG. 6.

Figure 6:
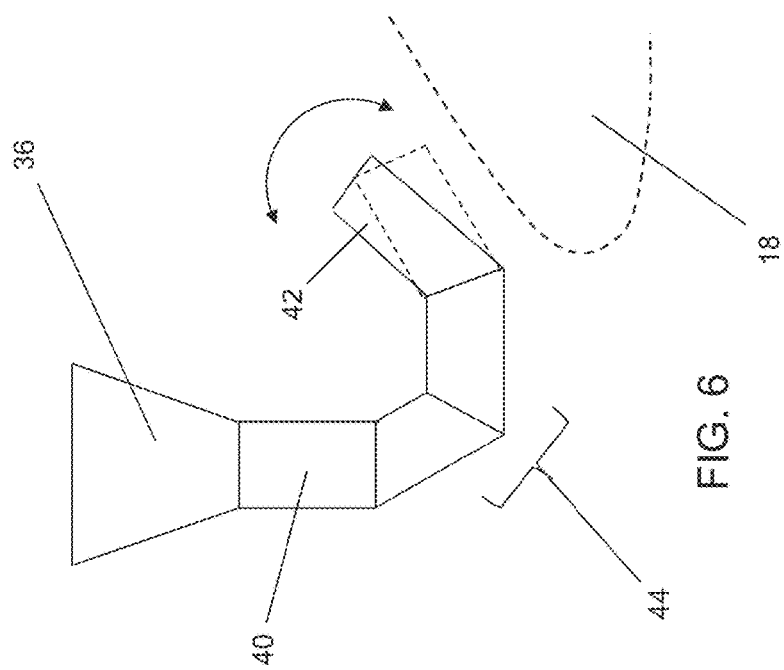
FIG. 6 is a side view of a frame support member in isolation.

For reasons of comfort and/or to accommodate different users, the support member 16 can be constructed to include at least some inherent adjustability as shown in FIG. 6. In the example shown in FIG. 6, the nose engaging portion 42 is flexible relative to the central portion 44 to enable the angle of the nose engaging portion 42 to be adjusted to suit different nose shapes. It can be appreciated that any or all of the other portions of the frame support member 16 can include flexibility to allow for additional degrees of freedom of movement in adjusting the angle and position of the nose engaging portion 42. This allows the safety eyewear 10 to be supported above and away from underlying primary eyewear such as the prescription eyeglasses 12 shown in FIGS. 1 and 2.

Figure 7A:
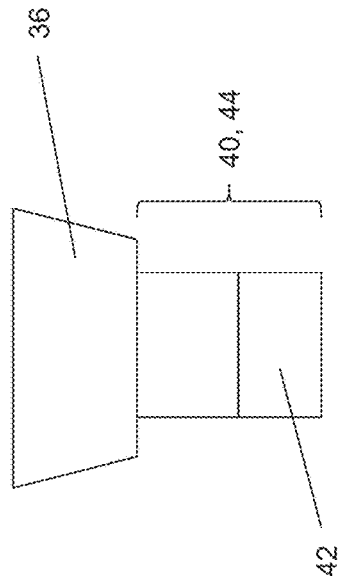
FIG. 7(a) is a front view of the frame support member in one implementation.
Figure 7B:
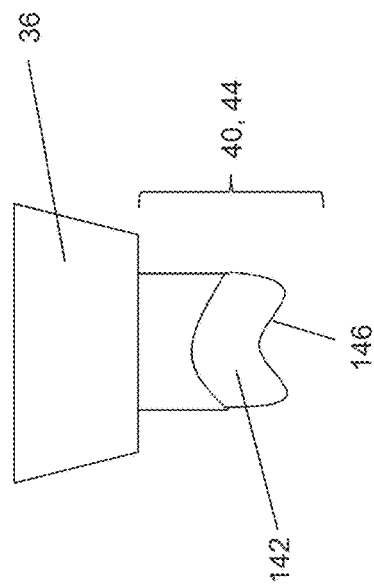
FIG. 7(b) is a front view of the frame support member in another implementation having a contoured nose-engaging portion.

FIG. 7(a) illustrates a front view of the frame support member 16 in one configuration in which the nose engaging portion 42 is substantially planar. However, as shown in FIG. 7(b), a contoured nose engaging portion 142 can instead be provided which includes a contoured nose engaging surface 146 that generally follows the curvature of the upper surface of a user's nose 18. It can be appreciated that the particular contour 146 shown in FIG. 7(b) is purely illustrative and other contours can be used, including triangular, a many-sided "trough", etc.

Figure 8A:
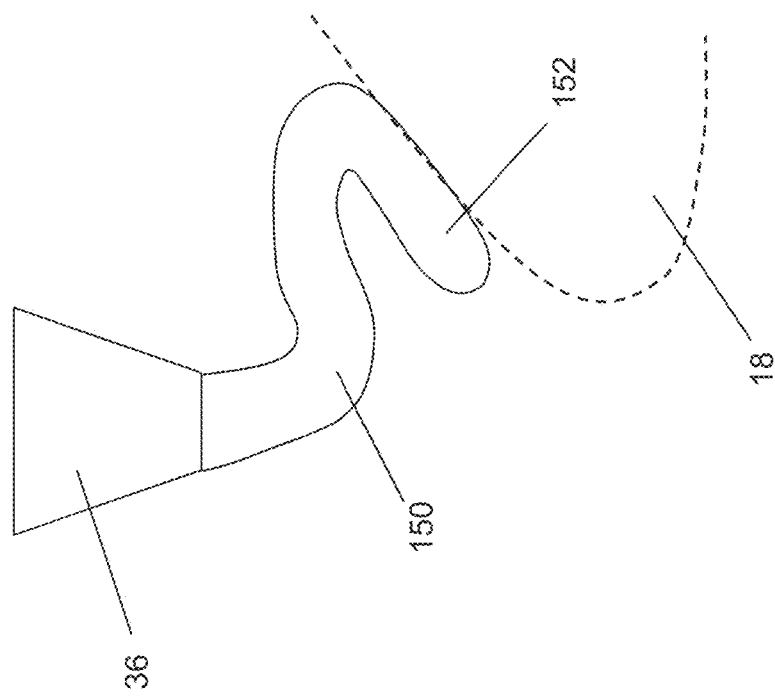
FIG. 8(a) is a side view of an alternative frame support member configuration.
Figure 8B:
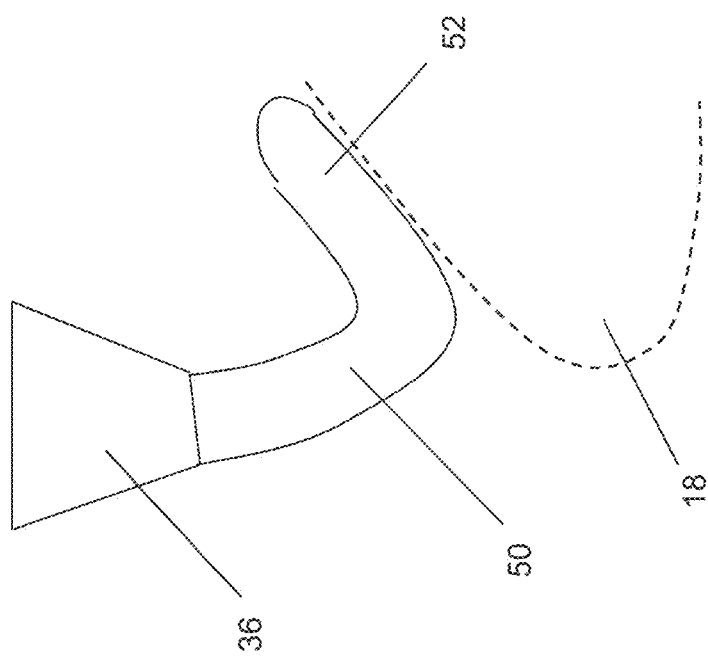
FIG. 8(b) is a side view of yet another alternative frame support member configuration.

The multi-portion support member 16 shown in FIGS. 6 and 7 is also only one possible configuration. For example, as shown in FIG. 8(a), a single curved member 50 with a nose engaging surface 52 at its distal end can be used. As with other configurations, the member 50 can be provided with inherent flexibility by selecting a suitably flexible material for the support member 50. The generally "C" shape for the support member 16 is also only one possible configuration. For example, as shown in FIG. 8(b), any suitable shape that provides a nose engaging portion 152 that is positioned behind and below the nose bridge 36 can provide the same separation between the primary and secondary eyewear. However, it may be noted that the generally "C" shape can minimize the proportion of the frame support member 16 that could interfere with a nose bridge or nose pieces of the primary eyewear and can be sized to be able to fit underneath such a nose bridge.

The adjustability of the frame support member 16 can also include extendibility, for example as shown in FIGS. 9(a) to 9(c). In the example shown in FIG. 9, the frame support member 16 and nose bridge 36 are connected to the vertically oriented portion 40, which can also be referred to as a frame engaging portion. The portion 40 is operatively connected to the remainder of the support assembly 16 via an extender 60. In this example, a frame support assembly is provided that includes the frame support member 16 adapted to include the extender 60. It can be appreciated that the vertical portion 40 (i.e. the frame engaging portion) can be constructed separately from the nose bridge 36 to enable the same safety eyewear 10 to be manufactured with or without the frame support assembly by providing a mechanism to couple the frame support assembly to the frame 10.

Figure 12:
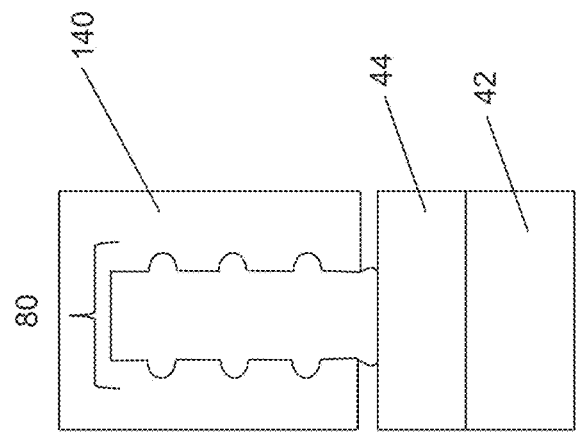
FIG. 12 is a rear view of a ratchet-type extender for a frame support assembly.

The extender 60 can be made extendible in various ways. For example, as shown in the figures, the extender 60 can be fixed to the frame support member 16 at one end and moveably connected to the vertical portion 40 (and nose bridge 36) at its other end. The moveable connection can be a ratchet-type mechanism 80 (see FIGS. 12 and 13), a frictional engagement, or using any other suitable adjustment means in order to provide a plurality of positions. The plurality of positions correspond to a plurality of distances between the nose engaging member 42 and the nose bridge 36 and frame 34. In this way, the extender 60 can be used to adjust the vertical separation between the primary and secondary eyewear. FIG. 9(a) illustrates the extender 60a in a first position, FIG. 9(b) illustrates the extender 60b in a second position, and FIG. 9(c) illustrates the extender 60c in a third position. It can be appreciated that the positions shown in FIGS. 9(a)-9(c) can represent a limited number of discrete positions or positions that are possible in a continuum, e.g., with a frictional connection allowing for a multitude of positions. That is, the provision of three discrete positions is illustrative only.

FIGS. 10(a) to 10(d) illustrate how the extender 60 and inherent flexibility in at least a portion of the frame support assembly 16 enables adjustability to suit many users. FIG. 10(a) illustrates a first configuration as a reference point, in which the extender 60b is in the second position shown in FIG. 9(b). In this first configuration, a vertical separation A, and a horizontal separation B are provided between the primary and secondary eyewear. FIG. 10(b) illustrates that by flexing the frame support member 16, an increased vertical separation A+ and decreased horizontal separation B− can be achieved, even with the extender 60a being in the first position shown in FIG. 9(a). As such, the combination of flexibility and extendibility enables adjustability in both directions.

In another example shown in FIG. 10(c), the frame support member 16 is flexed to push the nose engaging portion 42 further back, while raising it relative to the other portions 40, 44. This provides an increased horizontal separation B+, and decreased vertical separation A− when compared to FIG. 10(a). In a further example shown in FIG. 10(d), the same horizontal separation B as shown in FIG. 10(a) is provided with a further increased vertical separation A++ by using the extender 60c in the third position. It can be appreciated that the examples shown in FIG. 10 are illustrative and that many additional configurations are possible through a combination of flexibility and/or extendibility of the frame support member 16 and/or the overall frame support assembly.

Figure 11:
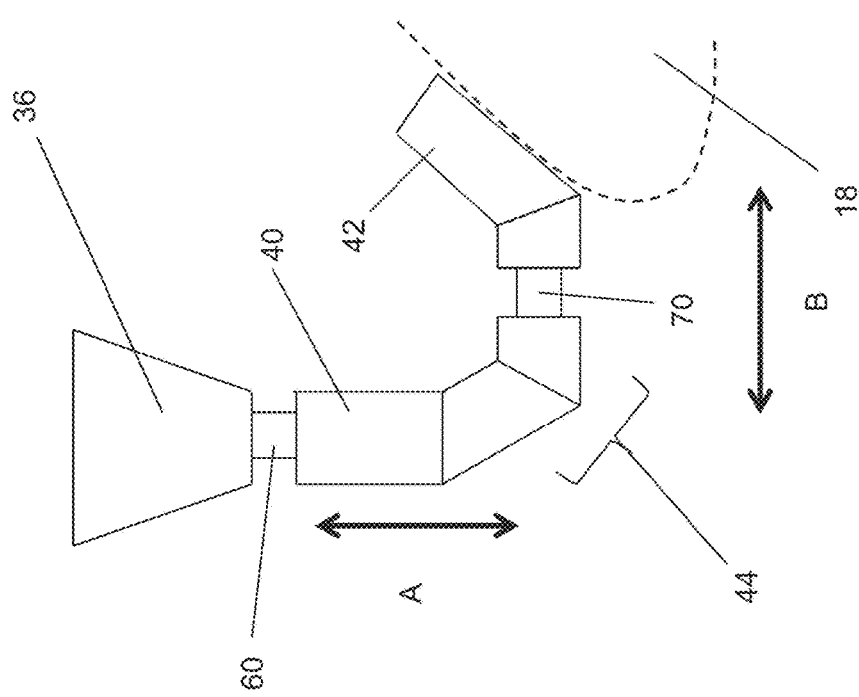
FIG. 11 is a side view of yet another alternative frame support member configuration having extendibility in multiple directions.

The multiple directions of adjustability exemplified herein can also be provided using multiple extenders 60, 70 as shown in FIG. 11. In this example, a second horizontally oriented extender 70 connects the central portion 46 to the nose engaging portion 42 of the frame support member 16. This allows the nose engaging portion 42 to be adjusted rearwardly of the nose bridge 36 as well as downwardly therefrom. It can be appreciated that the second extender 70 can be used with substantially rigid portions 40, 42, 44, or can be used with at least one flexible portion, e.g., the nose engaging portion 42 to allow for different angular orientations thereof.

FIGS. 13 to 21 illustrate an alternative adjustment assembly using an extendible frame support member 16. In this example, the frame support member 16 includes an extender 260 that is interposed between a frame 234 and a lens 232 of an eyewear assembly 200. It can be appreciated that the assembly 200 shown in FIG. 13 would also typically include a pair of arms for engaging a user's ears.

Figure 13:
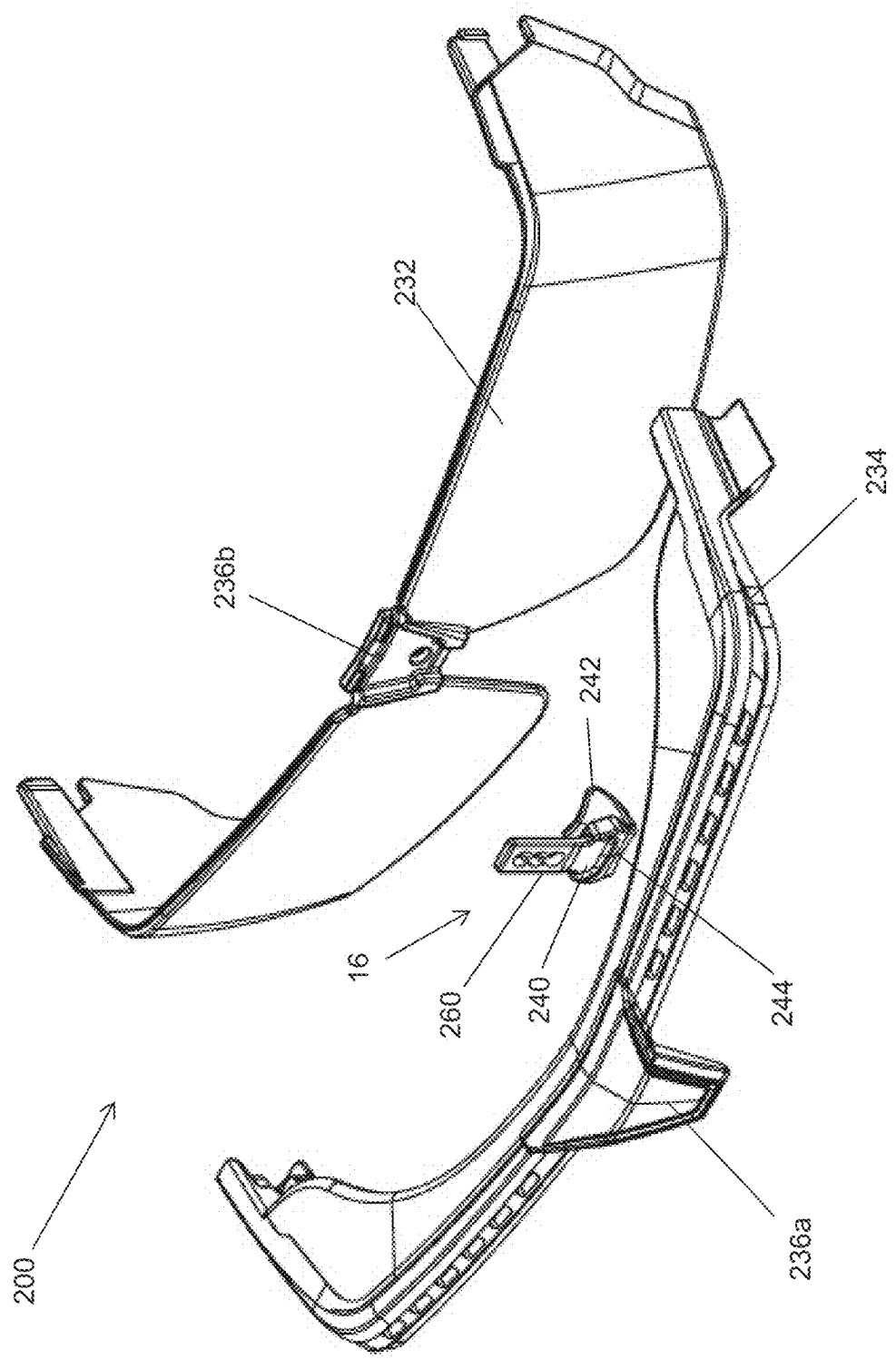
FIG. 13 is a front perspective view of an eyewear frame assembly having yet another alternative frame support member interposed between a frame portion and a lens portion.

Turning first to FIG. 13, the frame 234 includes a centrally positioned bridge portion 236a that connects through the frame support member 16 to a bridge portion 236b of the lens 232. This is shown from the opposite perspective view in FIG. 16. The support member 16 includes an extender 260 that is connected to a vertical portion 204 that in turn connects to a nose engaging portion 242 via a central portion 244, similar to the above embodiments.

FIG. 14 provides a more detailed view of the support member 16 in isolation. The support member 16 includes a contoured aperture 262 in the extender 260. The contoured aperture 262 includes a number of peaks 264 and valleys 266 that define a series of settings or positions such that a member that is sized substantially similar to the area between opposing valleys 266, for each setting, can be secured into and thus be positioned at that setting. As can be seen in FIG. 14, opposing valleys 266 of the interior sidewalls of the extender 260 each provide a generally circular area whose distance can be made to correspond substantially to the diameter of a circular member extending therethrough. The peaks 264 imposed between the areas at each position provide restricted areas along the aperture 262 such that any movement in the vertical direction would require additional effort to move the member through the restricted or otherwise narrowed sections between each setting to create a vertical adjustment mechanism for adjusting the position of the support member 16 relative to the frame 234 and lens 232 That is, the opposing peaks 264 are closer to each other than the opposing valleys 266 to resist free movement of the extendable attachment portion 260 relative to the frame 234.

In the view shown in FIG. 15(a), it can be seen that the bridge portion 236a can include a post 270 that acts as the aforementioned circular member extending through the aperture 262. In this way, the extender 260 can adjust the vertical positioning of the nose engaging member 242 relative to the eyewear assembly 200. The post 270 can have a relatively larger head with a central split to permit the post 270 to snap into engagement with the body of the post 270 seated within the aperture 262 as shown in FIG. 15(a). As illustrated in FIG. 15(b), the head portion of the post 270 can also snap into a hole 280 in the bridge portion 236b of the lens 232 to complete the assembly (see also FIG. 16).

Figure 16:
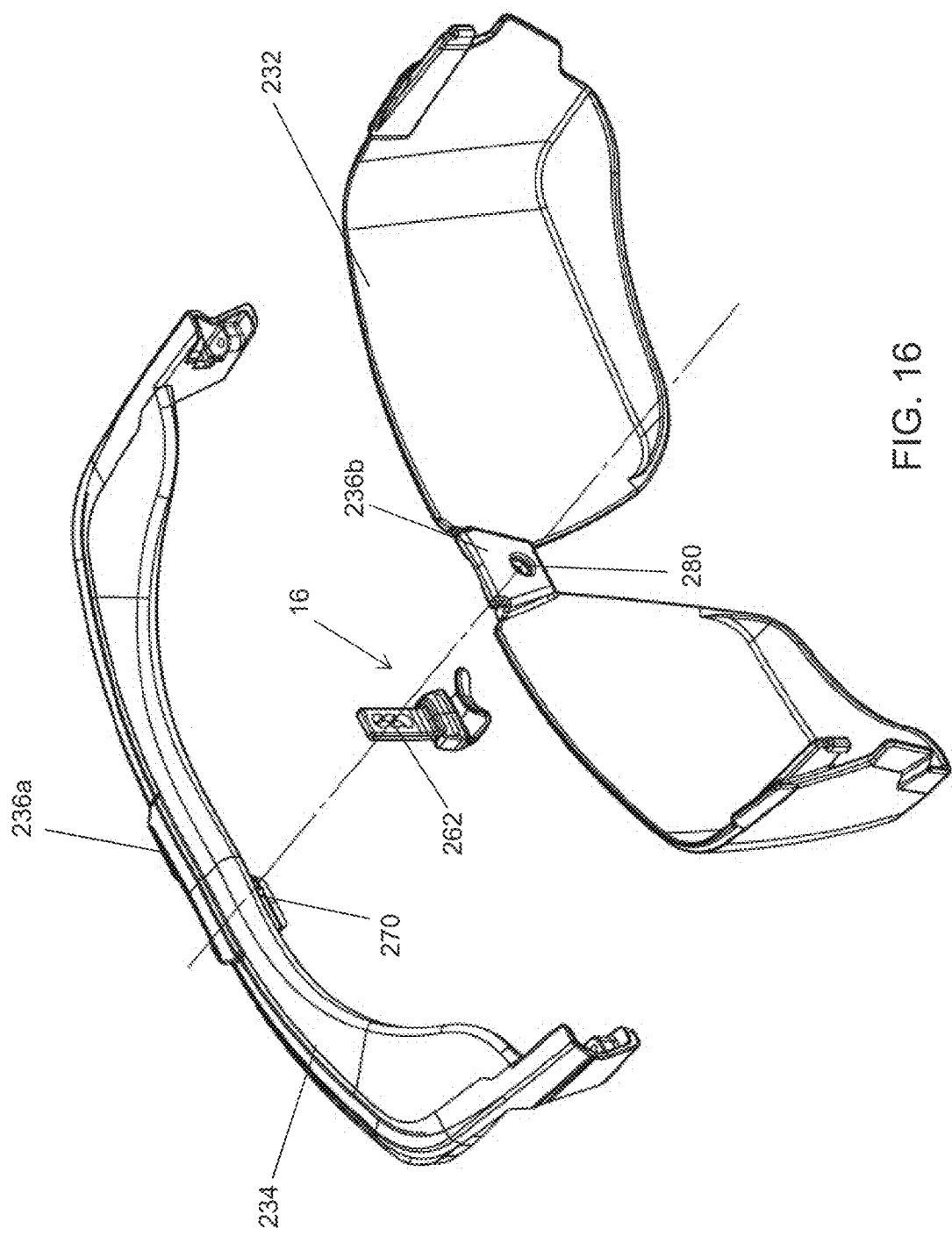
FIG. 16 is a rear perspective view of the assembly shown in FIG. 13.

As illustrated in FIGS. 13 and 16, the bridge portion 236b of the lens 232 can be slotted or otherwise configured to constrain the support member 16 to vertical movements, e.g., to inhibit rotation of the support member 16 relative to the eyewear assembly 200. This can also be seen in the cross-sectional view of FIG. 17 wherein when the post 270 is snapped into the hole 280 in the lens 232, the extender 260 is seated within the recessed area of the bridge portion 236b of the lens 232 with the bridge portion 236a of the frame 234 secured against the front of the lens 232. This positions the post 270 in a fixed vertical location such that vertical movement of the frame support member 16 adjusts the length of the extender 260 beyond the lowermost edge of the bridge portion 236a of the frame 234.

Figure 21:
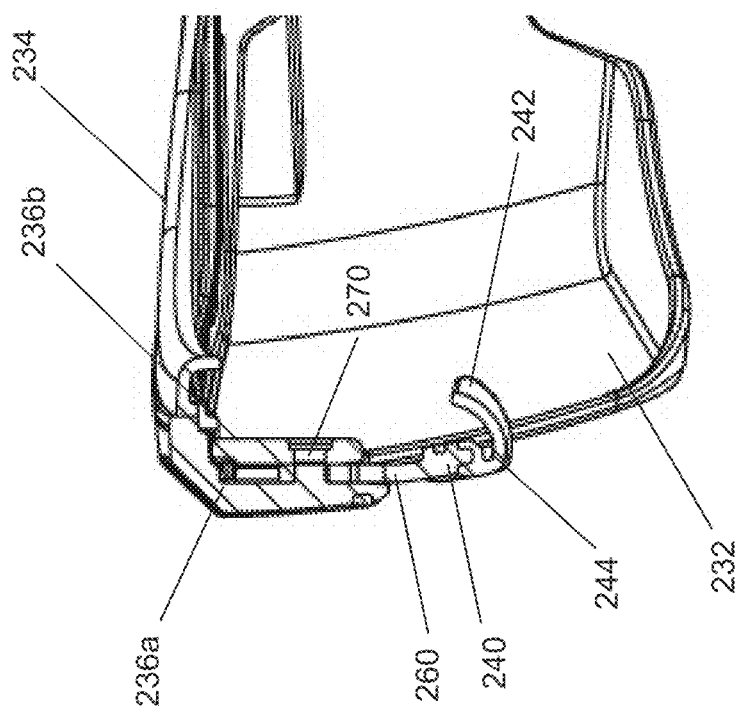
FIG. 21 is a sectional side view of the frame support member in another alternative position.
Figure 20:
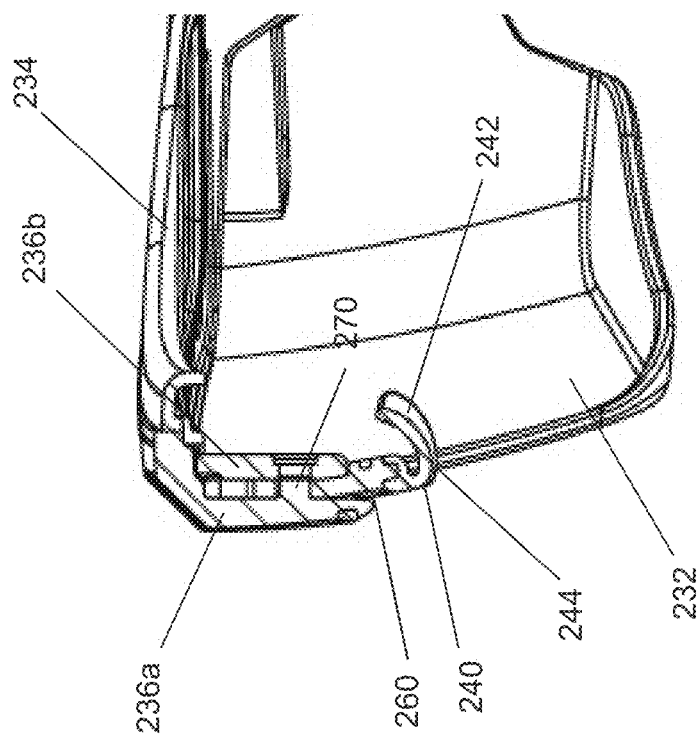
FIG. 20 is a sectional side view of the frame support member in an alternative position.

FIG. 18 provides a front view of the central area of eyewear assembly 200. Section A-A from FIG. 18 is shown in three different adjustable positions in FIGS. 19-21. In FIG. 19, a middle position is shown with the post 270 being positioned in a middle position of the contoured aperture 262. FIG. 20 illustrates an upper position with the post 270 being positioned in an uppermost position of the contoured aperture 262 to therefore place the nose engaging portion 242 closer to the frame 234 than the position shown in FIG. 19. FIG. 21 illustrates a lower position with the post 270 being positioned in a lowermost position of the contoured aperture 262 to therefore place the nose engaging portion 242 further from the frame 234 than the position shown in FIG. 19.

It can be appreciated that while the contoured aperture 262 (seen best in FIG. 14) is configured to have three positions, the aperture 262 can also include more or fewer positions by having more or fewer areas that are sized substantially the same as the post 270. It can also be appreciated that the extender 260 can be applied to any nose piece or support member to provide vertical adjustability thereof, and thus is not restricted to being used with the frame support members 16 described herein.

FIGS. 22-27 illustrate an adjustment assembly similar to that shown in FIGS. 13-21, with an alternative extendible frame support member 316. In this example, the frame support member 316 is interposed between a frame 334 and a lens 332 of an eyewear assembly 300. It can be appreciated that the eyewear assembly 300 shown in FIG. 22 would also typically include a pair of arms for engaging a user's ears and/or head.

Figure 23:
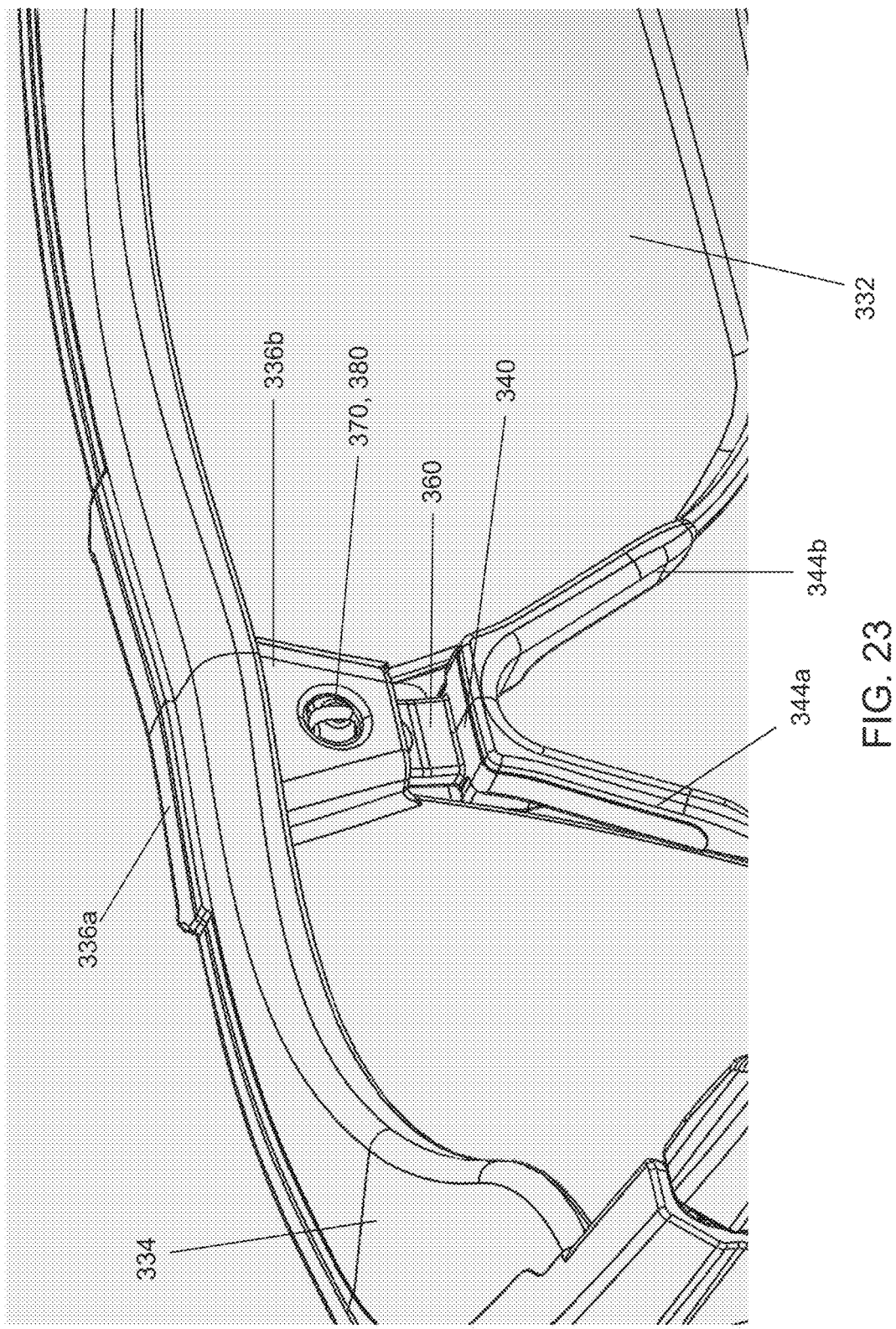
FIG. 23 is a rear perspective view of the eyewear frame assembly of FIG. 22.
Figure 24:
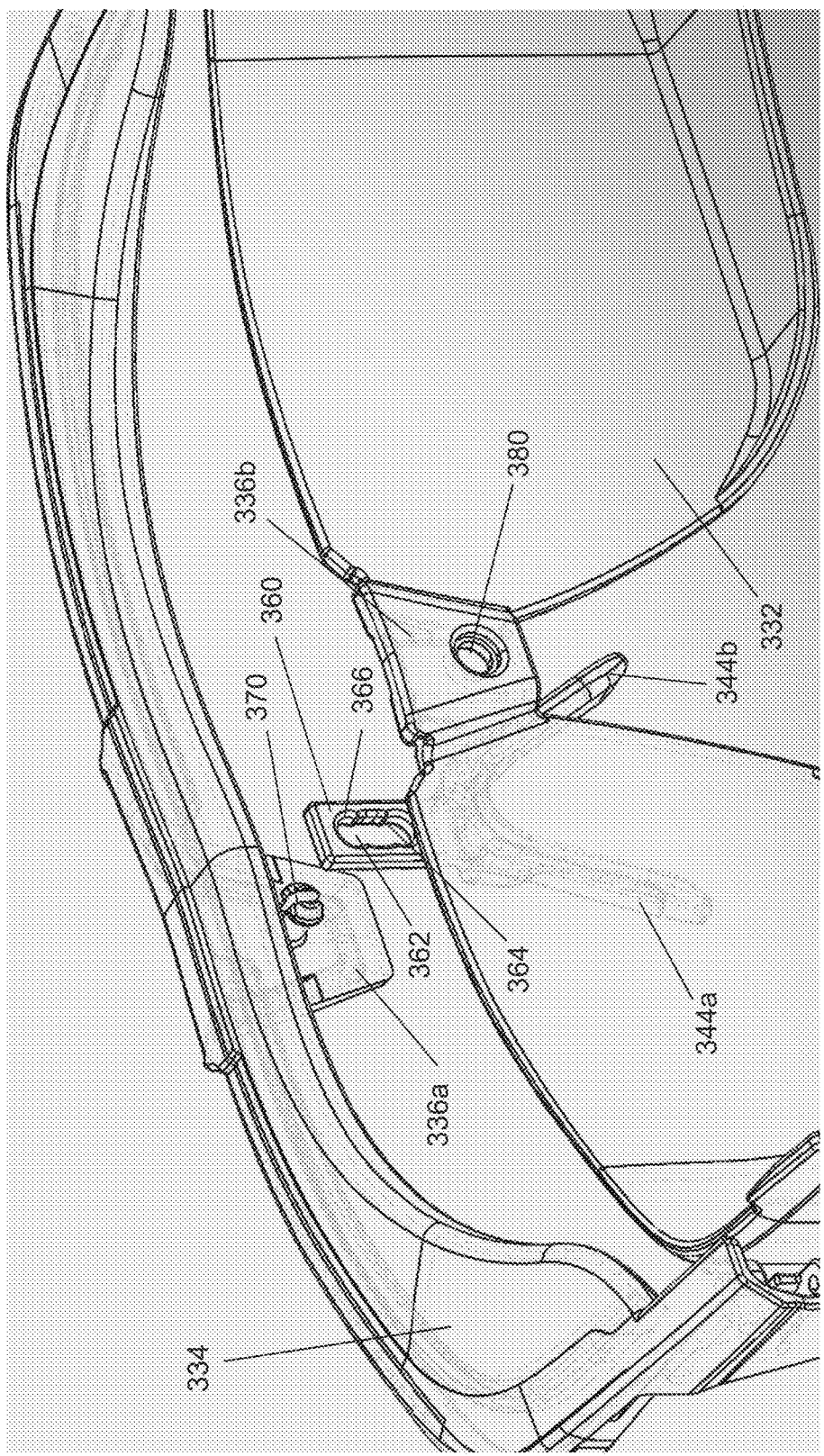
FIG. 24 is an exploded rear perspective view of the eyewear frame assembly of FIG. 22.

Turning first to FIGS. 22 and 23, the frame 334 includes a centrally positioned bridge portion 336a that connects through an extender 360 of the frame support member 316 to a bridge portion 336b of the lens 232. Referring additionally to FIG. 24, a post 370 extends from the bridge portion 336a of the frame 334 through a hole 380 in the bridge portion 336b of the lens 332, similar to the embodiment in FIGS. 13-21. In this example, the post 370 is slotted to permit separation and resilience in order to provide a "snap-in" fit into the hole 380 as illustrated in FIG. 23. The extender 360 is connected to a nosepiece 340. The nosepiece 340 in this example forks into a pair of nose engaging pads 344a, 344b, each sized and positioned to rest against opposing sides of a user's nose. It can be appreciated that the nosepiece 340 and nose engaging pads 344a, 344b can be made from a rigid material, or can be made of a flexible material, similar to the embodiments described above, in order to permit adjustability of the eyewear assembly 300 relative to a pair of prescription eyewear 12 in an OTG application. This flexibility and adjustability can be provided in any one or more directions, for example in the fore and aft directions as well as to pinch together or separate the pads 344a, 334b.

Figure 25:
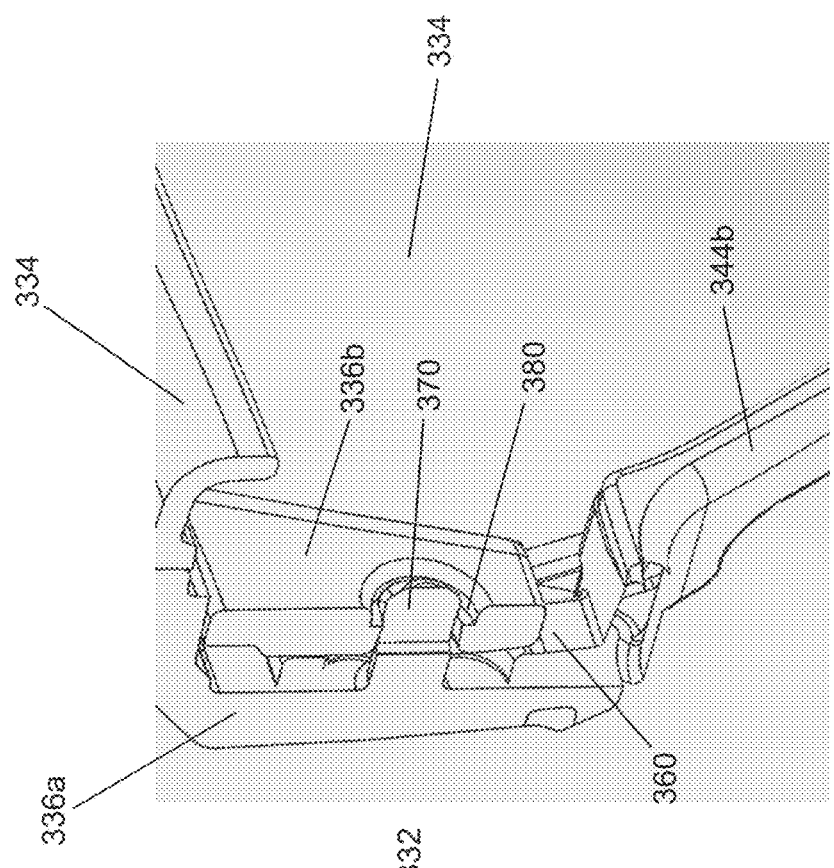
FIG. 25 is a sectional view of a nose bridge portion and the frame support member of FIG. 23 along line B-B.

As shown in greater detail in FIGS. 24 and 25, the support member 316 includes a contoured aperture 362 in the extender 360. The contoured aperture 362 includes a number of peaks 364 and valleys 366 that define a series of settings or positions such that a member that is sized substantially similar to the area between opposing valleys 366, for each setting, can be secured into and thus be positioned at that setting. As can be seen in FIG. 24, opposing valleys 366 of the interior sidewalls of the extender 360 each provide a generally curved or circular area whose distance can be made to correspond substantially to the diameter of a circular member extending therethrough, namely the post 370 in this example. The peaks 364 imposed between the areas at each position provide restricted areas along the aperture 362 such that any movement in the vertical direction would require additional effort to move the post 370 through the restricted or otherwise narrowed sections between each setting to create a vertical adjustment mechanism for adjusting the position of the support member 316 relative to the frame 334 and lens 332 That is, the opposing peaks 364 are closer to each other than the opposing valleys 366 to resist free movement of the extendable attachment portion 360 relative to the frame 334 during normal use.

Figure 26:
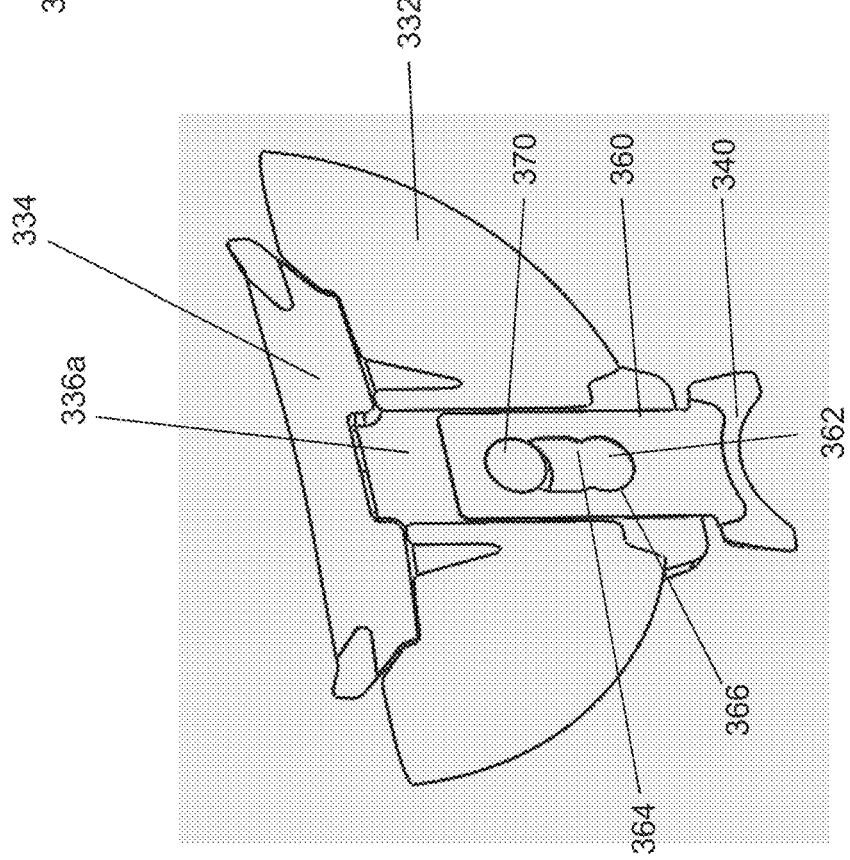
FIG. 26 is a sectional view along the line C-C in FIG. 23.

Turning to FIGS. 25 and 26, these sectioned illustrate that the extender 360 is slidable between the bridge portions 336a, 336b but restricted in its movement and positioning by the post 370 that snaps into the hole 380. This not only restricts the movement and positioning, but also retains the support member 316 with the eyewear assembly 300.

Figure 27C:
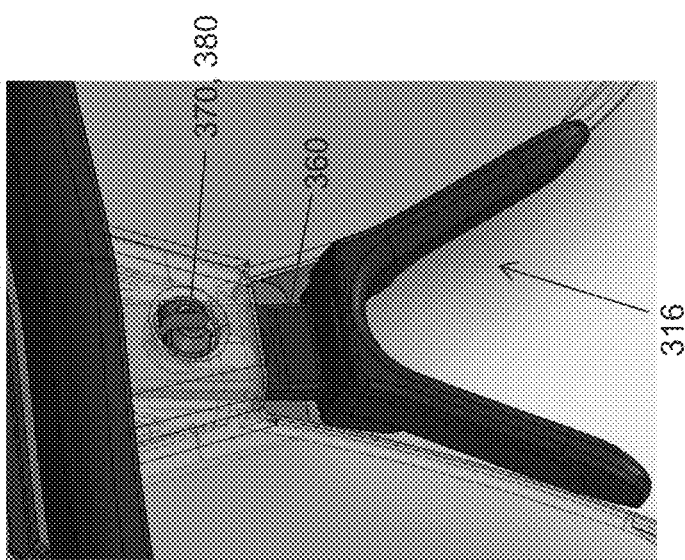
FIGS. 27(a), 27(b), and 27(c) are rear perspective views of low, mid and high positions for the frame support member of FIG. 22.
Figure 27B:
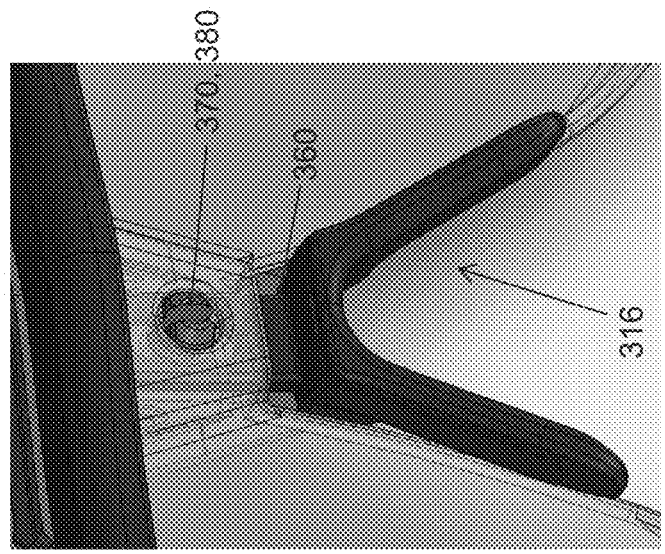
Figure 27A:
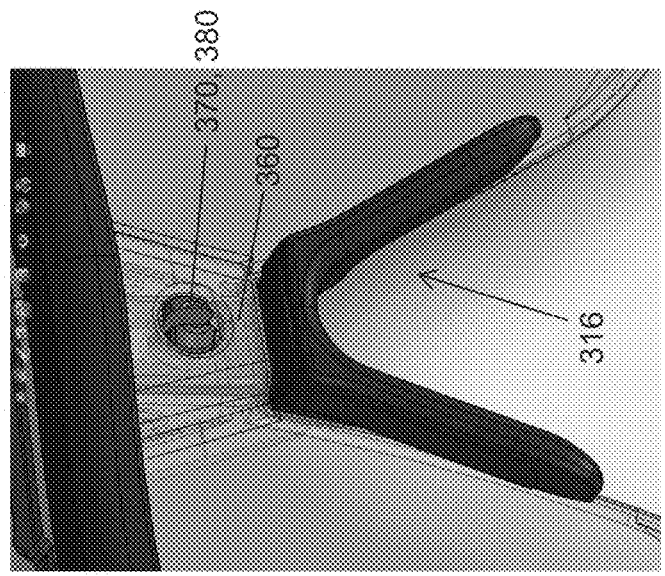

The series of views shown in FIGS. 27(a), 27(b), and 27(c) illustrate the adjustability of the support member 316 relative to the lens 332, in this example a low position in FIG. 27(a), a mid-position in FIG. 27(b), and a high position in FIG. 27(c).

It can therefore be appreciated from the embodiment shown in FIGS. 22-27 that the alternative adjustment assembly shown in FIGS. 13-21 can be applied to various types of frame support members 16, 316, including those with different types of nose pieces and nose engaging members.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. A frame support member for eyewear comprising a frame and a lens, the frame of the eyewear comprising a nose bridge portion, the frame support member comprising:
    an extendable attachment portion for coupling the frame support member to the nose bridge portion of the eyewear, wherein the attachment portion comprises a contoured aperture for receiving a post extending from the nose bridge portion or the lens of the eyewear, the post engaging and interacting with the contoured aperture to allow the attachment portion to selectively move between a plurality of vertical positions relative to the frame, the contoured aperture comprising a plurality of portions relatively wider than at least one narrower portion to define the plurality of vertical positions; and
    a nose engaging portion extending from the attachment portion for supporting the eyewear on a user.

2. The frame support member of claim 1, wherein the contoured aperture comprises a plurality of opposing valleys, and at least one pair of opposing peaks to define a plurality of circular shaped areas each corresponding to one of the vertical positions, wherein the opposing peaks are closer to each other than the opposing valleys to resist free movement of the extendable attachment portion relative to the eyewear.

3. The frame support member of claim 1, wherein the extendable attachment portion is sized to fit within a recessed portion of either the frame or a lens of the eyewear to inhibit rotation of the frame support member relative to the eyewear when the frame support member is attached to the frame and lens.

4. The frame support member of claim 1, wherein the nose engaging portion comprises a pair of nose engaging pads extending downwardly from the extendable attachment portion.

5. The frame support member of claim 1, wherein the post to be received by the aperture comprises a head portion that can be snapped into the aperture.

6. The frame support member of claim 5, wherein the head comprises a split to enable opposite portions to be flexed towards one another to snap the post into the aperture.

7. The frame support member of claim 1, wherein the eyewear is secondary eyewear worn over primary eyewear, the frame support member being configured to provide separation between the secondary eyewear and the primary eyewear when both eyewear are supported on the user's nose.

8. The frame support member of claim 7, wherein the secondary eyewear is safety eyewear.

9. The frame support member of claim 1, wherein the frame support member is configured to position the nose engaging portion below and behind the nose bridge for supporting the eyewear on a user.

10. The frame support member of claim 9, comprising a horizontally oriented extender.

11. The frame support member of claim 9, wherein the nose engaging portion extends downwardly and rearwardly from the extendable attachment portion.

12. The frame support member of claim 11, wherein the nose engaging portion is curved in at least an area that engages the user's nose.

13. The frame support member of claim 9, further comprising at least one flexible portion for adjusting the positioning of the nose engaging portion.

14. The frame support member of claim 13, wherein the at least one flexible portion enables the nose engaging portion to be angularly adjusted.

15. Eyewear comprising:
    a frame for supporting at least one lens, the frame comprising nose bridge portion;
    a frame support member comprising an extendable attachment portion for coupling the frame support member to the nose bridge portion of the eyewear, wherein the attachment portion comprises a contoured aperture for receiving a post extending from the nose bridge portion or the lens of the eyewear, the post engaging and interacting with the contoured aperture to allow the attachment portion to selectively move between a plurality of vertical positions relative to the frame, the contoured aperture comprising a plurality of portions relatively wider than at least one narrower portion to define the plurality of vertical positions;
    a nose engaging portion extending from the attachment portion for supporting the eyewear on a user; and
    wherein the frame support member is configured to position the nose engaging portion below and behind the nose bridge for supporting the eyewear on a user.

16. The eyewear of claim 15, wherein the contoured aperture comprises a plurality of opposing valleys, and at least one pair of opposing peaks to define a plurality of circular shaped areas each corresponding to one of the vertical positions, wherein the opposing peaks are closer to each other than the opposing valleys to resist free movement of the extendable attachment portion relative to the eyewear.

17. The eyewear of claim 15, wherein the extendable attachment portion is sized to fit within a recessed portion of either the frame or a lens of the eyewear to inhibit rotation of the frame support member relative to the eyewear when the frame support member is attached to the frame and lens.

18. The eyewear of claim 15, wherein the post to be received by the aperture comprises a head portion that can be snapped into the aperture.

19. The eyewear of claim 18, wherein the head comprises a split to enable opposite portions to be flexed towards one another to snap the post into the aperture.

20. The eyewear of claim 15, wherein the eyewear is secondary eyewear worn over primary eyewear, the frame support member being configured to provide separation between the secondary eyewear and the primary eyewear when both eyewear are supported on the user's nose.

21. The eyewear of claim 20, wherein the secondary eyewear is safety eyewear.

22. The eyewear of claim 15, further comprising a pair of arms coupled to the frame.

23. The eyewear of claim 22, wherein:
   the frame and nose bridge are formed to support a pair of lenses;
   the pair of arms are pivotally attached to the frame;
   the frame support member is coupled to the extendable attachment portion; and
   at least a portion of the frame support member has flexibility.

24. The eyewear of claim 15, wherein the frame support member is configured to position the nose engaging portion below and behind the nose bridge for supporting the eyewear on a user.

25. The eyewear of claim 24, wherein the nose engaging portion extends downwardly and rearwardly from the extendable attachment portion.

26. The eyewear of claim 25, wherein the nose engaging portion is curved in at least an area that engages the user's nose.

27. The eyewear of claim 25, comprising a horizontally oriented extender.

28. The eyewear of claim 25, further comprising at least one flexible portion for adjusting the positioning of the nose engaging portion.

29. The eyewear of claim 28, wherein the at least one flexible portion enables the nose engaging portion to be angularly adjusted.

* * * * *